United States Patent
Takagi

(10) Patent No.: US 8,607,766 B2
(45) Date of Patent: Dec. 17, 2013

(54) CONTROL APPARATUS FOR AN INTERNAL COMBUSTION ENGINE

(75) Inventor: Isao Takagi, Okazaki (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 998 days.

(21) Appl. No.: 12/670,486

(22) PCT Filed: Feb. 11, 2009

(86) PCT No.: PCT/IB2009/000236
§ 371 (c)(1),
(2), (4) Date: Jan. 25, 2010

(87) PCT Pub. No.: WO2009/101502
PCT Pub. Date: Aug. 20, 2009

(65) Prior Publication Data
US 2010/0186726 A1    Jul. 29, 2010

(30) Foreign Application Priority Data
Feb. 13, 2008  (JP) .................................. 2008-032298

(51) Int. Cl.
G06F 17/00    (2006.01)
G06F 19/00    (2011.01)
F02B 47/08    (2006.01)
F02M 25/07    (2006.01)

(52) U.S. Cl.
USPC ............ 123/568.16; 123/568.11; 123/568.21; 123/568.22; 123/198 DB; 123/198 F; 701/112

(58) Field of Classification Search
USPC ............. 123/568.11, 568.16, 568.21, 568.22, 123/198 F, 481, 198 DB, 333, 339.12, 344, 123/371, 370, 674, 675, 682, 684, 704; 701/101, 102, 103, 104, 105, 106, 110, 701/112, 114, 115
See application file for complete search history.

(56) References Cited

U.S. PATENT DOCUMENTS

| | | | | |
|---|---|---|---|---|
| 5,309,887 | A * | 5/1994 | Kondo et al. ............ | 123/568.16 |
| 8,224,558 | B2 * | 7/2012 | Katou et al. ................... | 701/110 |
| 2001/0053954 | A1 * | 12/2001 | Kawaguchi et al. .......... | 701/104 |
| 2002/0007821 | A1 * | 1/2002 | Isobe et al. .................... | 123/480 |

(Continued)

FOREIGN PATENT DOCUMENTS

EP    1 148 228 A2    10/2001
JP    2001-349231 A    12/2001

(Continued)

*Primary Examiner* — Stephen K Cronin
*Assistant Examiner* — Raza Najmuddin
(74) *Attorney, Agent, or Firm* — Sughrue Mion, PLLC

(57) ABSTRACT

When an abnormality determining process is cancelled when a fuel cut is stopped, an EGR valve (33), which is open wider than normal from the process, is returned to its original opening amount (i.e., fully closed), and fuel injection in an engine (1) is resumed. However, during execution of the abnormality determining process, an EGR passage (32) is full of air. Also, when the EGR valve (33) is returned to the fully closed state, there is a response delay in the change in the flowrate of air that flows from the EGR passage (32) into the air passage (4) following that return, such that excess air flows into the air passage (4). As a result, the intake air amount of the engine (1) becomes excessive for the fuel injection quantity after fuel injection resumes. The fuel injection quantity is thus increase corrected to inhibit this from happening.

16 Claims, 8 Drawing Sheets

(56) References Cited

U.S. PATENT DOCUMENTS

| | | |
|---|---|---|
| 2002/0139357 A1 | 10/2002 | Kawaguchi et al. |
| 2003/0106367 A1 | 6/2003 | Osaki et al. |
| 2005/0210970 A1 | 9/2005 | Terada |
| 2007/0062499 A1 | 3/2007 | Miyasako et al. |
| 2008/0202482 A1* | 8/2008 | Furuta et al. ............ 123/568.16 |
| 2010/0263627 A1* | 10/2010 | Whitney et al. ............... 123/399 |

FOREIGN PATENT DOCUMENTS

| | | |
|---|---|---|
| JP | 2002-004901 A | 1/2002 |
| JP | 2002-250242 A | 9/2002 |
| JP | 2008128118 A * | 6/2008 |

* cited by examiner

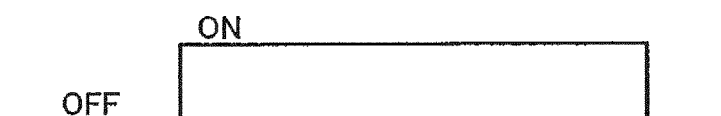
FIG. 2A  FUEL CUT
FIG. 2B  FUEL INJECTION QUANTITY
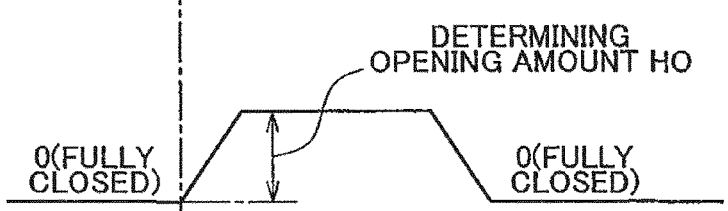
FIG. 2C  EGR VALVE OPENING AMOUNT
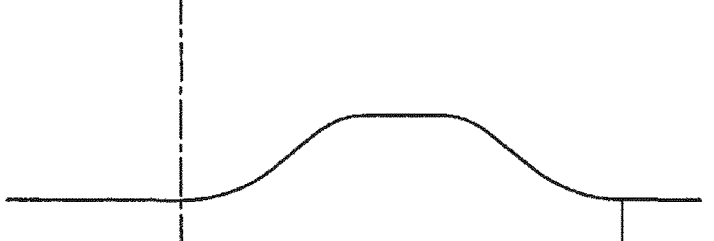
FIG. 2D  GAS FLOWRATE FROM EGR PASSAGE TO INTAKE PASSAGE
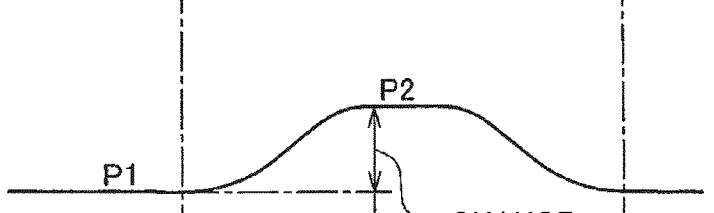
FIG. 2E  INTAKE PRESSURE Pm
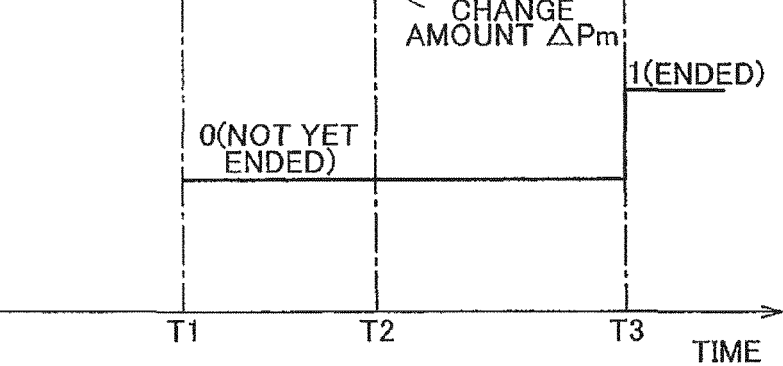
FIG. 2F  FLAG F

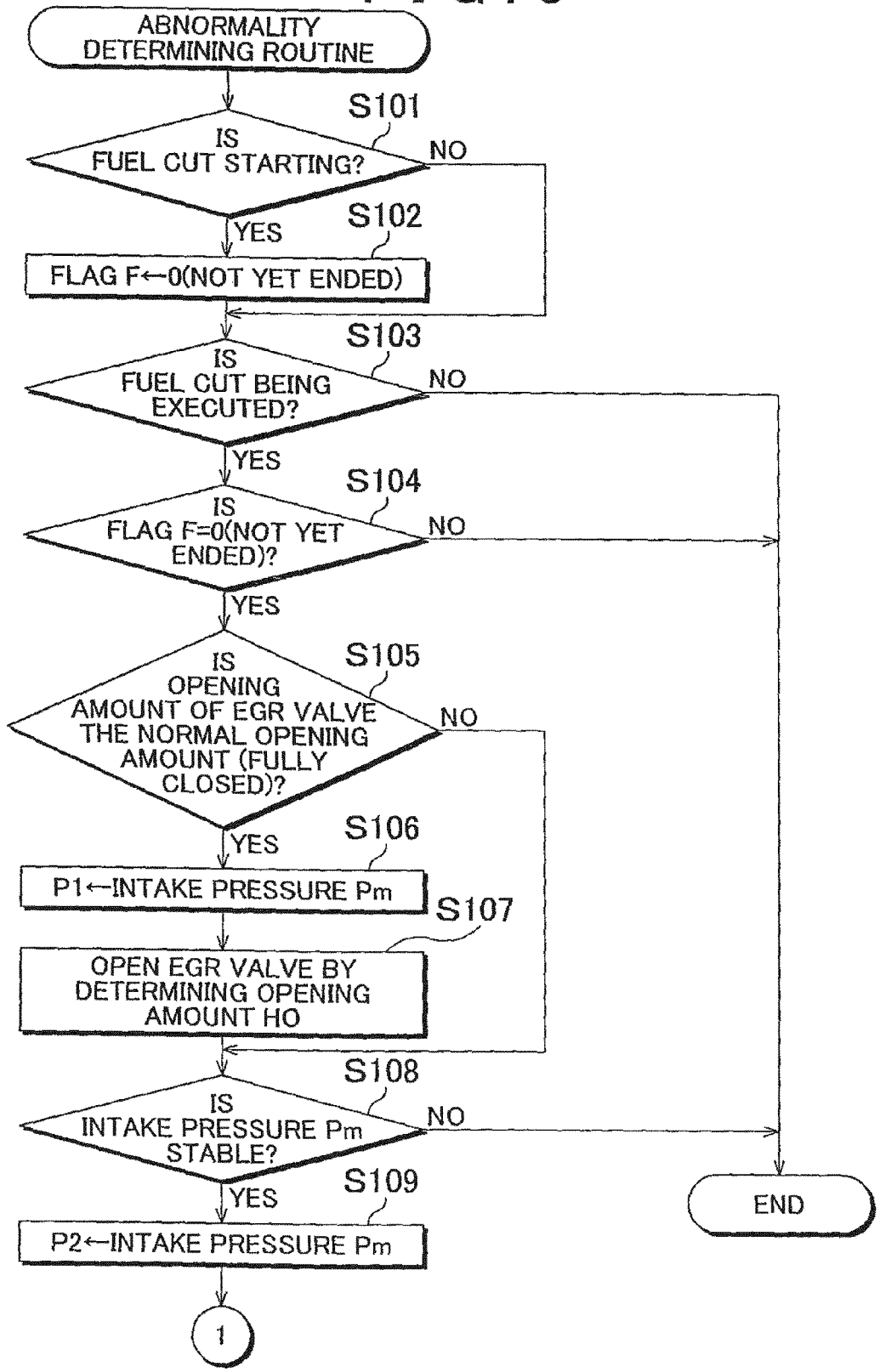

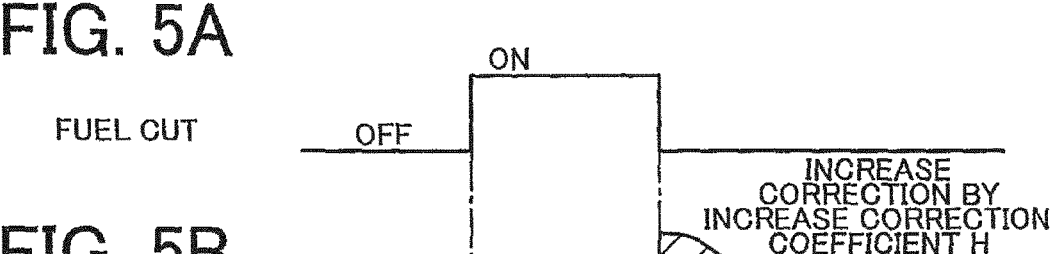
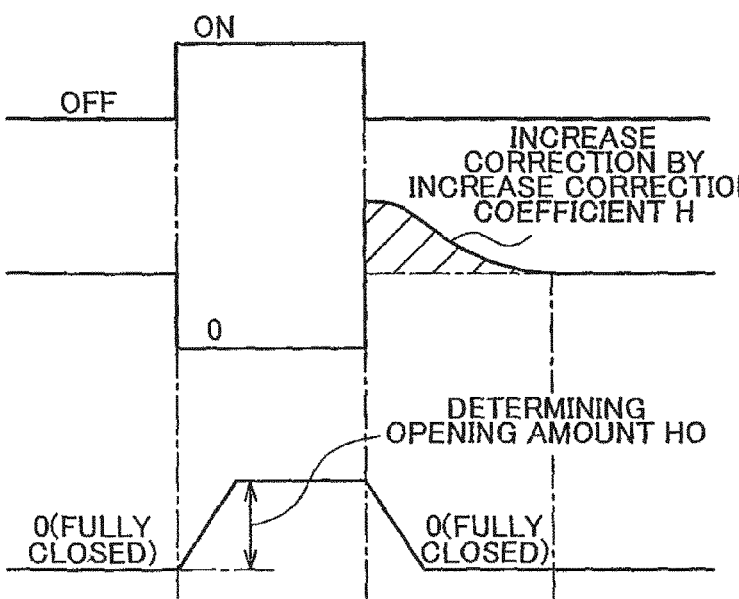
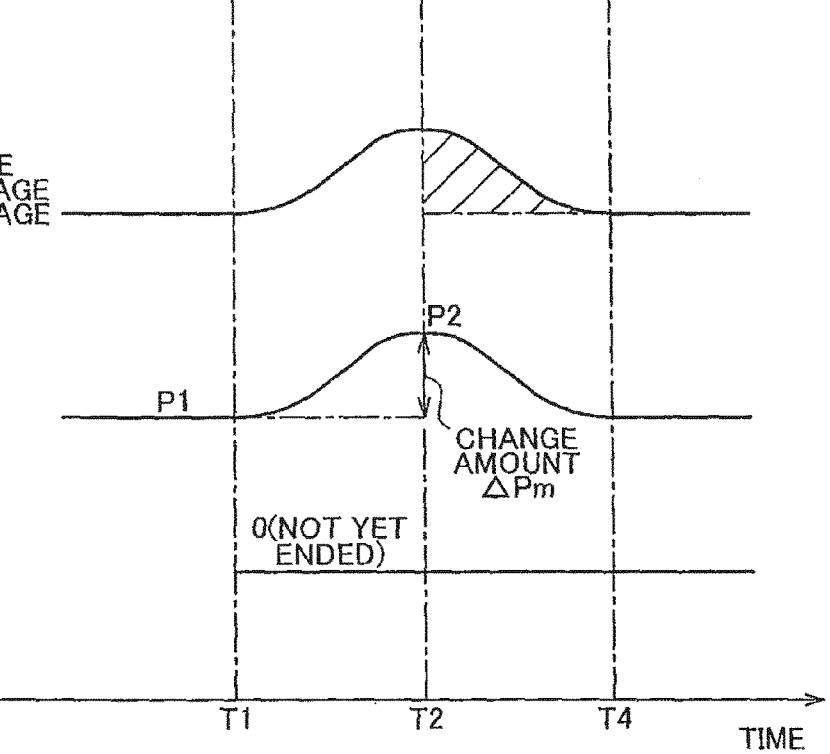

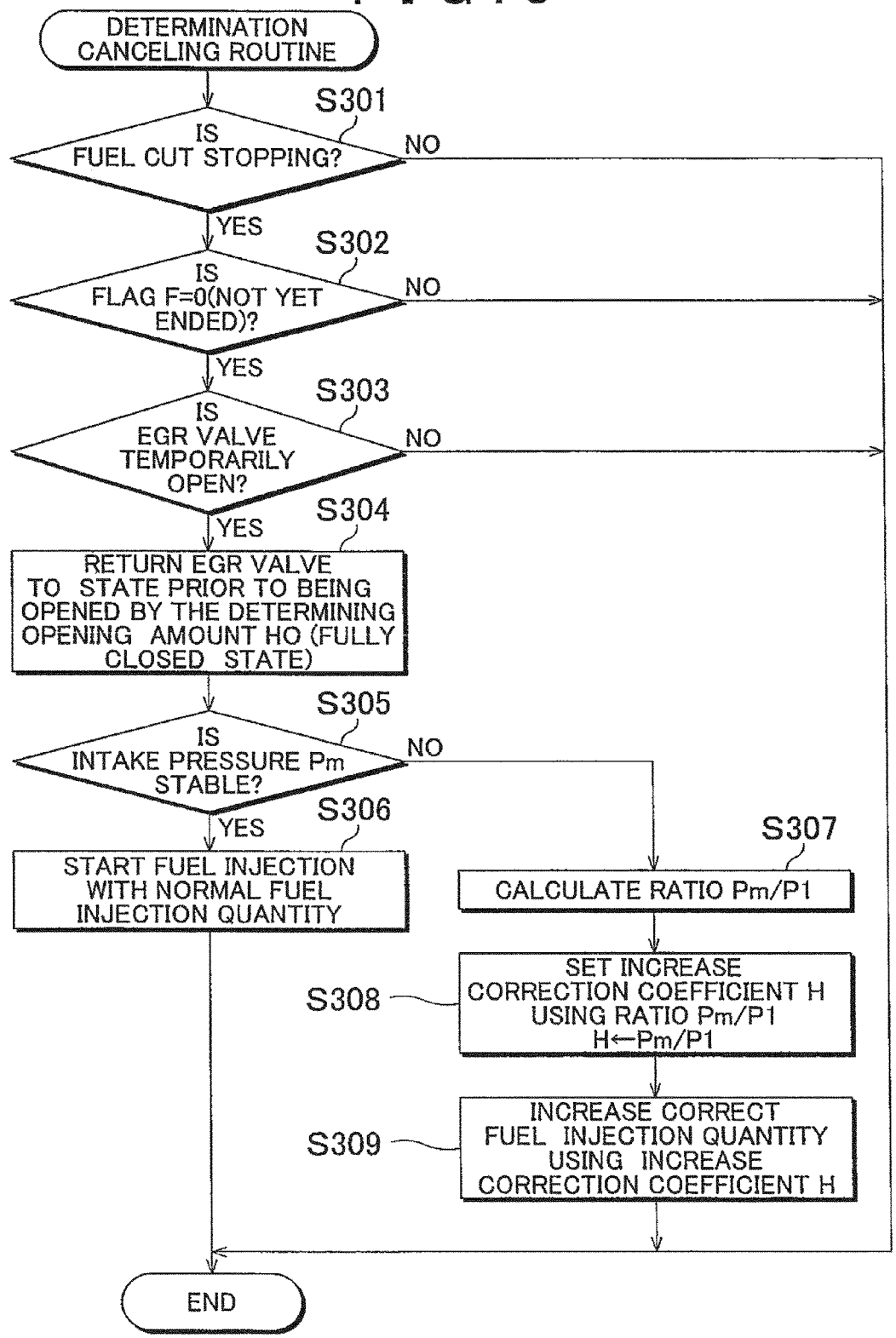

CONTROL APPARATUS FOR AN INTERNAL COMBUSTION ENGINE

BACKGROUND OF THE INVENTION

1. Field of the Invention

The invention relates to a control apparatus for an internal combustion engine.

2. Description of the Related Art

One known internal combustion engine such as a vehicular engine is provided with an EGR mechanism which returns some of the exhaust gas that flows through an exhaust passage to an intake passage in order to reduce the amount of nitrogen oxides ($NO_x$) in the exhaust gas. This EGR mechanism includes an EGR passage through which some of the exhaust gas in the exhaust passage flows into the intake passage, and an EGR valve which is driven open and closed to change the amount of exhaust gas that flows from the EGR passage into the intake passage (in this specification, this exhaust gas will also simply be referred to as "EGR gas"). When some of the exhaust gas of the internal combustion engine is returned to the intake passage using the EGR mechanism in this way, it results is there being some gas which does not contribute to combustion (i.e., the exhaust gas) in the combustion chamber of the internal combustion engine when fuel is burned in the combustion chamber. As a result, the combustion temperature of the fuel in the combustion chamber decreases, which reduces the amount of $NO_x$ that is produced, such that the exhaust gas of the internal combustion engine contains less $NO_x$.

Also, in an internal combustion engine provided with an EGR mechanism, an abnormality determining process for determining whether there is an abnormality in the mechanism opens and closes the EGR valve and determines whether there is an abnormality based on a change in the intake pressure of the internal combustion engine at that time. However, execution of this abnormality determining process requires an engine operating state in which the intake pressure of the internal combustion engine is stable, and execution of the abnormality determining process may be difficult in an internal combustion engine in which the EGR valve is closed when the engine is in such an operating state. This is because when the abnormality determining process is executed while the engine is operating with a stable intake pressure, the EGR valve which is closed opens, and as it does so, exhaust gas is recirculated (i.e., EGR is performed) to the intake passage, which is not done during normal engine operation and may cause the internal combustion engine to stall or the like.

Therefore, as described in Japanese Patent Application Publication No. 2002-4901 (JP-A-2002-4901) (paragraphs [0002], [0030], and [0031]), it is conceivable to execute the abnormality determining process described above during a fuel cut in the internal combustion engine, in which case the engine is in a state in which the intake pressure is stable and engine operation is not affected by EGR. Incidentally, a fuel cut in the internal combustion engine is performed when i) the vehicle provided with the engine is decelerating, ii) the accelerator is not being depressed, and iii) the vehicle speed is equal to or greater than a predetermined value greater than 0. In JP-A-2002-4901, the abnormality determining process temporarily opens the EGR valve, which is closed, during a fuel cut, and determines whether there is an abnormality in the EGR mechanism based on a change in the intake pressure at that time. As a result, the abnormality determining process is executed without causing engine stall or the like, and it can be determined whether there is an abnormality in the EGR mechanism through this process. Incidentally, it is presumed that after determining whether there is an abnormality in the EGR mechanism during a fuel cut, the EGR valve, which is temporarily open, will be closed.

It is also conceivable that the fuel cut may be stopped from the vehicle coming to a sudden stop or accelerating or the like while the EGR valve is temporarily open from execution of the abnormality determining process during the fuel cut before whether it has been determined there is an abnormality of the EGR mechanism. In this case, the abnormality determining process is cancelled, and the EGR valve, which has been temporarily opened, is closed, which is the state of the EGR valve prior to execution of the abnormality determining process, i.e., the normal state of the EGR valve. Also, fuel injection in the internal combustion engine resumes when the fuel cut stops, and the fuel injection quantity of the engine is a value which corresponds to the engine operating state, e.g., the engine speed and engine load and the like, at that time. More specifically, the fuel injection quantity at this time is a value that enables the air-fuel ratio of the air-fuel mixture in the combustion chamber of the internal combustion engine to be an appropriate value on the condition that the EGR valve is closed and EGR is not being performed.

However, when the EGR valve is temporarily open from executing the abnormality determining process during a fuel cut, the following inevitably occurs in connection to the fact that the EGR passage is filled with air, when the abnormality determining process is cancelled when the fuel cut stops.

That is, even if the EGR valve, which is temporarily open from executing the abnormality determining process, is closed when that process is cancelled, air in the EGR passage (i.e., the EGR mechanism) flows into the intake passage at that time, causing the amount of air in the combustion chamber to become excessive by that amount with respect to the fuel injection quantity after fuel injection resumes in the internal combustion engine. Incidentally, the reason why air in the EGR passage flows into the intake passage when closing the EGR valve when the abnormality determining process is cancelled is because there is a response delay both in the closing the EGR valve and in the reduction of the flowrate of gas (i.e., air) that flows through the EGR passage and into the intake passage when the EGR valve is closed.

Therefore, after the abnormality determining process is cancelled when the fuel cut stops and fuel injection in the internal combustion engine resumes, the air-fuel ratio of the air-fuel mixture in the combustion chamber inevitably becomes leaner than the appropriate value until the flowrate of the gas that flows from the EGR passage into the intake passage finishes decreasing when the EGR valve closes. When the air-fuel ratio of the air-fuel mixture in the combustion chamber becomes leaner than the appropriate value in this way, combustion of the air-fuel mixture may become unstable, possibly resulting in a decrease in engine speed or engine stall.

SUMMARY OF THE INVENTION

This invention provides a control apparatus for an internal combustion engine, which inhibits a reduction in engine speed or engine stall or the like due to the combustion of the air-fuel mixture in the combustion chamber becoming unstable after an abnormality determining process is cancelled when a fuel cut ends and fuel injection is resumed.

A first aspect of the invention relates to a control apparatus for an internal combustion engine provided with an EGR mechanism that can change an EGR amount by driving an EGR valve open and closed. The control apparatus includes an abnormality determining portion, a control portion, an opening amount returning portion, and an increase correcting portion. The abnormality determining portion performs an abnormality determining process which increases an opening amount of the EGR valve during a fuel cut in the internal combustion engine wider than normal by a determining opening amount which is the opening amount of the EGR valve that is required to perform the abnormality determining process, and determines whether there is an abnormality in the EGR mechanism based on a change in intake pressure in the internal combustion engine following the increase in the opening amount of the EGR valve. The control portion changes the opening amount of the EGR valve to the normal opening amount by reducing the opening amount of the EGR valve by the determining opening amount after the abnormality determining portion determines whether there is an abnormality. The opening amount returning portion returns the opening amount of the EGR valve to the normal opening amount, which is the opening amount before the opening amount is increased by the determining opening amount, when the fuel cut is stopped and the abnormality determining process is cancelled while the opening amount of the EGR valve is wider than normal as a result of the abnormality determining process. The increase correcting portion increase-corrects a fuel injection quantity of the internal combustion engine from after fuel injection in the internal combustion engine resumes when the fuel cut stops until a flowrate of gas that flows from the EGR mechanism into an intake passage finishes decreasing following the decrease in the opening amount of the EGR valve by the opening amount returning portion.

According to this first aspect, when the abnormality determining process is cancelled when the fuel cut stops, the opening amount of the EGR valve that has been increased so that it is wider than normal from the abnormality determining process is returned to the normal opening amount, which is the opening amount before the opening amount is increased by the determining opening amount (i.e., the opening amount of the EGR valve is reduced to the normal opening amount). Also, fuel injection in the internal combustion engine resumes when the fuel cut stops. The fuel injection quantity at this time is a value that enables the air-fuel ratio of the air-fuel mixture in the combustion chamber of the internal combustion engine to be an appropriate value on the condition that the EGR valve is in the normal state, i.e., the state before being opened by the determining opening amount.

However, when the abnormality determining process is being executed and the EGR valve is temporarily open, the EGR mechanism is full of air. When the EGR valve is returned to the state that it was in before being opened by the determining opening amount following cancellation of the abnormality determining process, there is a response delay in the closing of the EGR valve at that time as well as in the decrease of the flowrate of gas (i.e., air) that flows from the EGR mechanism to the intake passage following the closing of the EGR valve (it should be noted that in this specification, the term "closing" here refers simply to the opening amount of the valve becoming smaller, and is not limited to the valve being fully closed). Therefore, even if the EGR valve is closed following cancellation of the abnormality determining process so that its opening amount changes back to the normal opening amount before being opened by the determining opening amount, excess air in the EGR mechanism at that time will flow into the intake passage because of the response delay. This may result in there being too much air, by that excess amount, in the combustion chamber for the fuel injection quantity after fuel injection resumes in the internal combustion engine. As a result, the air-fuel ratio of the air-fuel mixture in the combustion chamber will become leaner than the appropriate value, causing combustion of the air-fuel mixture to become unstable, which may in turn cause a decrease in engine speed or cause the engine to stall or the like.

According to the first aspect described above, the fuel injection quantity of the internal combustion engine is increase corrected from after the abnormality determining process is cancelled when the fuel cut stops and fuel injection resumes in the internal combustion engine until the flowrate of gas (i.e., air) that flows from the EGR passage into the intake passage finishes decreasing following the decrease in the opening amount of the EGR valve. As a result, even if there is a response delay in the closing of the EGR valve and in the decrease in the flowrate of the gas (i.e., air) that flows from the EGR mechanism into the intake passage from the closing of the EGR valve, the air-fuel ratio of the air-fuel mixture in the combustion chamber can be inhibited from becoming leaner than the appropriate value. Moreover, it is also possible to inhibit a loss of engine speed or even engine stall or the like which may result from combustion of the air-fuel mixture becoming unstable as a result of the air-fuel ratio of the air-fuel mixture in the combustion chamber becoming leaner than the appropriate value.

In the first aspect, the increase correcting portion may reduce the increase correction of the fuel injection quantity to match the decrease in the flowrate of the gas.

When reducing the opening amount of the EGR valve to the normal opening amount, which is the opening amount before the opening amount is increased by the determining opening amount, following cancellation of the abnormality determining process, the flowrate of the gas (i.e., air) that flows from the EGR mechanism into the intake passage gradually decreases from that reduction in the opening amount while reflecting the response delay. According to the structure described above, the increase correction of the fuel injection quantity of the internal combustion engine is reduced to match the decrease in the flowrate of the gas that flows from the EGR mechanism into the intake passage so the air-fuel ratio of the air-fuel mixture in the combustion chamber can be inhibited from becoming leaner or richer than the appropriate value during that increase correction, which enables the air-fuel ratio to be maintained at the appropriate value.

In the structure described above, the increase correcting portion may increase-correct the fuel injection quantity using an increase correction value. Also, the increase correcting portion may i) variably set the increase correction value to be a reduced value to match the decrease in the opening amount of the EGR valve by the opening amount returning portion, and ii) gradually reduces that increase correction value to match the decrease in the flowrate of the gas.

According to this structure, when reducing the opening amount of the EGR valve to the opening amount before the increase by the determining opening amount when the abnormality determining process is cancelled, there is a response delay in the reduction of the opening amount of the EGR valve. However, the increase correction value can be variably set to a reduced value based on the reduction in the opening amount of the EGR valve at that time. Therefore, that increase correction value can be made a value that corresponds to the opening amount of the EGR valve that includes the response delay in the reduction of the opening amount. Also, when reducing the opening amount of the EGR valve to the normal opening amount before the increase by the determining opening amount, there is a response delay in the change in the flowrate of gas (i.e., air) that flows from the EGR mechanism into the intake passage following the reduction in the opening amount of the EGR valve. However, the increase correction value at that time is gradually reduced to match the decrease in the flowrate of the gas (i.e., air) that flows from the EGR mechanism into the intake passage, as described above. As a result, the increase correction value can be made to accurately correspond to the flowrate of the gas which includes the response delay in the decrease of the flowrate. Thus, by increase-correcting the fuel injection quantity using this increase correction value, the air-fuel ratio of the air-fuel mixture within the combustion chamber can be kept even more precisely at the appropriate value.

In the structure described above, the increase correcting portion may increase-correct the fuel injection quantity of the internal combustion engine using an increase correction value. The increase correcting portion may also store the intake pressure of the internal combustion engine before the opening amount of the EGR valve is increased wider than normal by the determining opening amount during the fuel cut as a reference pressure. Further, the increase correcting portion may reduce the increase correction value as the actual intake pressure of the internal combustion engine approaches the reference pressure from after fuel injection in the internal combustion engine resumes when the fuel cut stops until the flowrate of the gas finishes decreasing.

When the opening amount of the EGR valve is reduced to the normal opening amount before being increased by the determining opening amount when the abnormality determining process is cancelled, there is a response delay in the reduction of the opening amount of the EGR valve, as well as in the decrease of the flowrate of gas (i.e., air) that flows from the EGR mechanism into the intake passage following the reduction in the opening amount of the EGR valve. Incidentally, the actual intake pressure of the internal combustion engine when the response delay occurs in the decrease of the gas flowrate is a value that corresponds to the actual flowrate of the gas with that response delay. Also, the reference pressure is a value that corresponds to the gas flowrate after the opening amount of the EGR valve has been reduced to the normal opening amount, which is the opening amount before the opening amount is increased by the determining opening amount, when the flowrate of the gas has finished decreasing as a result of the opening amount of the EGR valve being reduced. According to the structure described above, when the fuel injection quantity of the internal combustion engine is increase corrected by the increase correction value, the increase correction value is reduced as the actual intake pressure of the internal combustion engine approaches the reference pressure so the increase correction value can be made to accurately correspond to the flowrate of gas that includes the response delay in the decrease in the flowrate. Accordingly, the air-fuel ratio of the air-fuel mixture within the combustion chamber can be more precisely maintained at the appropriate value by increase-correcting the fuel injection quantity using that increase correction value.

In the structure described above, the increase correcting portion may reduce the increase correction value as a ratio of the actual intake pressure of the internal combustion engine to the reference pressure approaches 1 from after fuel injection in the internal combustion engine resumes when the fuel cut stops until the flowrate of the gas finishes decreasing.

Throughout the entire intake pressure region, i.e., from the low intake pressure region to the high intake pressure region, the ratio of the actual intake pressure of the internal combustion engine to the reference pressure becomes an appropriate value as a value that corresponds to the degree to which the intake air amount is excessive for the fuel injection quantity, which is caused by the response delay in the reduction of the flowrate of gas that flows from the EGR mechanism into the intake passage when the opening amount of the EGR valve is reduced by the opening amount returning portion.

Supposing that, for example, the difference between the actual intake pressure of the internal combustion engine and the intake pressure is used as the value that corresponds to the degree to which the intake air amount is excessive for the fuel injection quantity, then that difference must be corrected according to the intake pressure in order to be an appropriate value for the value that corresponds to the degree to which the intake air amount is excessive for the fuel injection quantity. This is because the sensitivity when the change in the degree to which the intake air amount is excessive for the fuel injection quantity is expressed as a change in that difference changes depending on the intake pressure at that time. In contrast, the sensitivity when the change in the degree to which the intake air amount is excessive for the fuel injection quantity is expressed as a change in the ratio of the actual intake pressure to the reference pressure is constant regardless of the intake pressure so there is no need to make a correction according to the intake pressure as described above. Therefore, the ratio can be made an appropriate value for the value that corresponds to the degree to which the intake air amount is excessive for the fuel injection quantity.

Also, in the structure described above, the increase correction value is reduced as the ratio approaches 1 so it can be an appropriate value as a value used to increase-correct the fuel injection quantity in order to inhibit the intake air amount from becoming excessive for the fuel injection quantity, which is caused by the response delay in the flowrate of gas that flows from the EGR mechanism into the intake passage when the opening amount of the EGR valve is reduced by the opening amount returning portion. Accordingly, the air-fuel ratio of the air-fuel mixture within the combustion chamber can be more precisely maintained at the appropriate value by increase-correcting the fuel injection quantity using that increase correction value.

In the structure described above, the increase correcting portion may make the increase correction of the fuel injection quantity constant. Also, the increase correcting portion may increase the increase correction more as atmospheric pressure increases. Further, the increase correcting portion may reduce the increase correction more as intake air temperature increases, and the normal opening amount of the EGR valve may be the opening amount when the EGR valve is fully closed.

In the structure described above, the flowrate of gas that flows from the EGR mechanism into the intake passage may be regarded to have finished decreasing, following a decrease in the opening amount of the EGR valve by the opening amount returning portion, when the intake pressure in the intake passage has stabilized.

A second aspect of the invention relates to an internal combustion engine control method for performing an abnormality determining process of i) increasing an opening amount of the EGR valve during a fuel cut in the internal combustion engine, which is provided with an EGR mechanism that can change an EGR amount by driving an EGR valve open and closed, wider than normal by a determining opening amount, ii) determining whether there is an abnormality in the EGR mechanism based on a change in intake pressure in the internal combustion engine following the increase in the opening amount of the EGR valve, and iii) changing the opening amount of the EGR valve to the normal opening amount by reducing the opening amount of the EGR valve by the determining opening amount after the abnormality determination has been made. This control method includes returning the opening amount of the EGR valve to the normal opening amount, which is the opening amount before the opening amount is increased by the determining opening amount, when the fuel cut is stopped and the abnormality determining process is cancelled while the opening amount of the EGR valve is wider than normal; and increase-correcting a fuel injection quantity of the internal combustion engine from after fuel injection in the internal combustion engine resumes when the fuel cut stops until a flowrate of gas that flows from the EGR mechanism into an intake passage finishes decreasing following the decrease in the opening amount of the EGR valve.

In the second aspect, the increase correction of the fuel injection quantity may be reduced to match the decrease in the flowrate of the gas.

In the method described above, the increase correction may i) increase-correct the fuel injection quantity using an increase correction value, ii) variably set the increase correction value to be a reduced value to match the decrease in the opening amount of the EGR valve, and iii) gradually reduce the increase correction value to match the decrease in the flowrate of the gas.

In the method described above, the increase correction may i) increase-correct the fuel injection quantity of the internal combustion engine using an increase correction value, ii) store the intake pressure of the internal combustion engine before the opening amount of the EGR valve is increased wider than normal by the determining opening amount during the fuel cut as a reference pressure, and iii) reduce the increase correction value as the actual intake pressure of the internal combustion engine approaches the reference pressure from after fuel injection in the internal combustion engine resumes when the fuel cut stops until the flowrate of the gas finishes decreasing.

In the method described above, the increase correction value may be reduced as a ratio of the actual intake pressure of the internal combustion engine to the reference pressure approaches 1 from after fuel injection in the internal combustion engine resumes when the fuel cut stops until the flowrate of the gas finishes decreasing.

In the method described above, the increase correction may be made using an increase correction coefficient (H), increase correction coefficient $H \leftarrow$ increase correction coefficient $H_{i-1}$ of last calculation$-(1/n) \times$(increase correction coefficient $H_{i-1}$ of last calculation$-$increase correction coefficient $H_i$ of current calculation), where n is an arbitrary natural number greater than 1.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIGS. 2A to 2F are time charts illustrating the status (i.e., the on/off state) of a fuel cut (FIG. 2A), the change in the fuel injection quantity (FIG. 2B), the change in the opening amount of the EGR valve (FIG. 2C), the change in the flowrate of gas flowing from the EGR passage to the intake passage (FIG. 2D), the change in the intake pressure (FIG. 2E), and the set state of a flag (FIG. 2F), respectively, when an abnormality determining routine is executed in the first example embodiment of the invention;

FIG. 3 is a flowchart illustrating an abnormality determining routine according to the first example embodiment of the invention;

FIGS. 5A to 5F are time charts illustrating the status (i.e., the on/off state) of a fuel cut (FIG. 5A), the change in the fuel injection quantity (FIG. 5B), the change in the opening amount of the EGR valve (FIG. 5C), the change in the flowrate of gas flowing from the EGR passage to the intake passage (FIG. 5D), the change in the intake pressure (FIG. 5E), and the set state of a flag (FIG. 5F), respectively, when an abnormality determining routine is executed in the first example embodiment of the invention;

FIG. 8 is a flowchart illustrating a routine that is executed when the abnormality determining routine is cancelled according to a second example embodiment

DETAILED DESCRIPTION OF THE EMBODIMENTS

Hereinafter, a first example embodiment in which the invention is applied to a vehicular engine will be described with reference to FIGS. 1 to 7.

Figure 1:
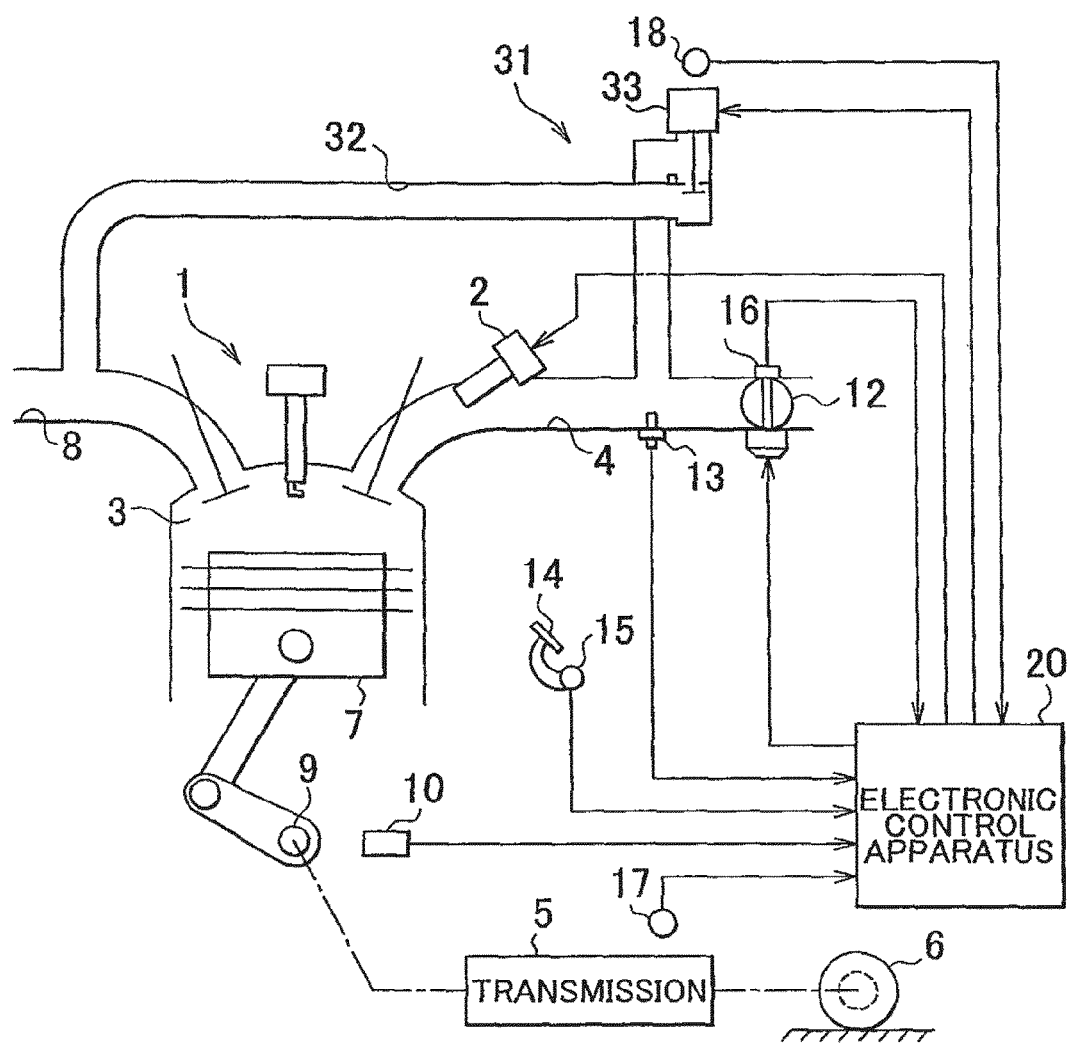
FIG. 1 is a diagram schematically showing an entire engine to which a control apparatus according to a first example embodiment of the invention is applied.

In the engine 1 shown in FIG. 1, air is drawn into a combustion chamber 3 from an intake passage 4, while fuel of an amount corresponding to the amount of that air (i.e., the intake air amount) is injected from a fuel injection valve 2 into the intake passage 4 and supplied into the combustion chamber 3. This air and fuel form an air-fuel mixture which, when combusted in the combustion chamber 3, generates force which moves a piston 7 of the engine 1 in a reciprocating manner, rotating a crankshaft 9 that serves as an output shaft of the engine 1 as it does so. This rotation is then transmitted via a drive system that includes a transmission 5, such as an automatic transmission, to a driving wheel 6.

The engine 1 is provided with an EGR mechanism 31 which returns some of the exhaust gas that flows through an exhaust gas passage 8 back into the intake passage 4 in order to reduce the amount of nitrogen oxides ($NO_x$) in the exhaust gas. This EGR mechanism 31 includes an EGR passage 32 which leads some of the exhaust gas in the exhaust passage 8 back into the intake passage 4, and an EGR valve 33 which is driven open and closed to change the amount of exhaust gas (i.e., EGR amount) that flows from the EGR passage 32 into the intake passage 4. When some of the exhaust gas of the engine 1 is returned to the intake passage 4 using the EGR mechanism 31 in this way, it results is there being some gas which does not contribute to combustion (i.e., the exhaust gas) in the combustion chamber 3 when the air-fuel mixture is burned in the combustion chamber 3. As a result, the combustion temperature of the air-fuel mixture in the combustion chamber 3 decreases, which reduces the amount of $NO_x$ in the exhaust gas of the engine 1.

The vehicle is provided with an electronic control apparatus 20 that executes various control operations related to the engine 1 and the transmission 5 and the like. This electronic control apparatus 20 includes a CPU that executes various calculations relating to the control, ROM in which programs and data necessary for that control are stored, RAM in which the calculation results of the CPU are temporarily stored, and input/output ports for sending and receiving signals to and from other devices, and the like.

Various sensors and the like are connected to the input port of the electronic control apparatus 20. Some of these sensors include an accelerator position sensor 15, a throttle position sensor 16, a vacuum sensor 13, a crank position sensor 10, a vehicle speed sensor 17, and an opening amount sensor 18. The accelerator position sensor 15 detects the depression amount of an accelerator pedal 14 that is depressed by a driver of the vehicle (i.e., an accelerator depression amount). The throttle position sensor 16 detects the opening amount of a throttle valve 12 provided in the intake passage 4 (i.e., a throttle opening amount). The vacuum sensor 13 detects the pressure downstream of the throttle valve 12 in the intake passage 4 (i.e., an intake pressure Pm). The crank position sensor 10 outputs a signal indicative of the rotation of the crankshaft 9 which serves as the output shaft of the engine 1, and the vehicle speed sensor 17 detects the speed of the vehicle. The opening amount sensor 18 detects the opening amount of the EGR valve 33.

Further, drive circuits for the fuel injection valve 2, the throttle valve 12, and the EGR valve 33 and the like are connected to the output port of the electronic control apparatus 20.

The electronic control apparatus 20 outputs command signals to the drive circuits of various equipment connected to the output port, according to the engine operating state which is ascertained by the detection signals received from the sensors described above. In this way, the electronic control apparatus 20 executes various control operations for controlling the amount of fuel injected from the fuel injection valve 2, the opening amount of the throttle valve 12, and the opening amount of the EGR valve 33, and the like.

In the opening amount control of the throttle valve 12, the throttle opening amount is adjusted based on the accelerator depression amount so as to increase (i.e., open wider) as the accelerator depression amount increases. Accordingly, the intake air amount of the engine 1 is a value that corresponds to the accelerator depression amount.

In the opening amount control of the EGR valve 33, the opening amount of the EGR valve 33 is adjusted according to the operating region of the engine 1 that is determined by the engine speed and the engine load, for example. Accordingly, the amount of exhaust gas that is recirculated from the exhaust passage 8 to the intake passage 4 in the engine 1 (i.e., the amount of EGR gas) is a value that is appropriate for engine operation at that time. Incidentally, the engine speed is obtained based on the detection signal from the crank position sensor 10. Furthermore, the engine load is calculated from the engine speed and a parameter corresponding to the intake air amount of the engine 1. The parameter corresponding to the intake air amount in this case may be, for example, the actual measured value of the intake pressure Pm of the engine 1 obtained based on the detection signal from the vacuum sensor 13.

In the fuel injection quantity control, a command value for the fuel injection quantity in order to obtain the quantity of fuel required for engine operation is calculated based on the engine speed and the engine load, and fuel of a quantity corresponding to that command value is injected from the fuel injection valve 2. When fuel injection quantity control is performed in this way, fuel of a quantity corresponding to the intake air amount of the engine 1 is injected from the fuel injection valve 2 into the intake passage 4 and supplied into the combustion chamber 3 such that the air-fuel ratio of the air-fuel mixture in the combustion chamber 3 comes to be an appropriate value. Incidentally, the intake air amount of the engine 1 tends to become smaller as the opening amount of the EGR valve 33, which is adjusted based on the engine speed and the engine load, becomes wider and the EGR amount increases. Therefore, the command value for the fuel injection quantity is calculated based on the engine speed and the engine load taking this tendency into account so that it becomes smaller as the opening amount of the EGR valve 33 increases or becomes wider (i.e., as the EGR amount increases).

Also, in the fuel injection quantity control, a fuel cut is also performed which stops the injection of fuel from the fuel injection valve 2 by setting the fuel injection quantity to 0 when i) the vehicle is decelerating, ii) the accelerator is not being depressed, i.e., the accelerator depression amount is 0, and iii) the vehicle speed is equal to or greater than a predetermined value that is greater than 0, in order to improve the fuel efficiency of the engine 1. Incidentally, even during such a fuel cut, air is still drawn into the combustion chamber 3 from the intake passage 4 because the crankshaft 9 is rotating from the rotation of the driving wheel 6 which is transmitted to the engine 1 as the vehicle decelerates. The intake air amount of the engine 1 (i.e., the intake pressure Pm) at this time is relatively stable.

Next, an abnormality determining process (i.e., routine) for determining whether there is an abnormality in the EGR mechanism 31 provided in the engine 1 will be described. In this abnormality determining routine, the EGR valve 33 is opened and closed and the change in the intake pressure Pm of the engine 1 is measured at that time. A determination as to whether there is an abnormality in the EGR mechanism 31 is then made based on this change. However, in order to execute the abnormality determining routine, the engine operating state must be such that the intake pressure Pm is stable, and it may be difficult to execute the abnormality determining routine in the engine 1 in which the EGR valve 33 is closed when the engine 1 is in such an operating state. This is because when the abnormality determining routine is executed while the engine 1 is operating with a stable intake pressure, the EGR valve 33 which is closed opens, and as it does so, exhaust gas is recirculated (i.e., EGR is performed) to the intake passage 4, which is not done during normal engine operation and may cause the engine 1 to stall or the like.

In view of this, in this example embodiment, the abnormality determining routine is executed during a fuel cut in the engine 1 when the intake pressure is stable and performing EGR will not affect engine operation.

That is, when the fuel cut is started as shown in FIG. 2A and the fuel injection quantity is set to 0 as shown in FIG. 2B (i.e., timing T1), the opening amount of the EGR valve 33 is increased to a preset determining opening amount HO as shown in FIG. 2C. Incidentally, during a fuel cut, the EGR valve 33 is normally fully closed so when the abnormality determining routine is executed, the opening amount of the EGR valve 33 is increased by the determining opening amount HO described above from 0 (fully closed). An optimum value obtained through testing or the like beforehand is used as this determining opening amount HO.

By increasing the opening amount of the EGR valve 33 by the determining opening amount HO from the normal opening amount (i.e., fully closed), the flowrate of the gas that flows from the EGR passage 32 into the intake passage 4 increases as shown in FIG. 2D, and as the flowrate increases, so too does the intake pressure Pm, as shown in FIG. 2E. Then it is determined whether there is an abnormality in the EGR mechanism 31 based on the amount of change ΔPm in the intake pressure Pm when the EGR valve 33 is opened by the determining opening amount HO, i.e., based on the amount of change ΔPm which is the difference between the intake pressure P1 before the change in the opening amount of the EGR valve 33 and the intake pressure P2 after the change in the opening amount of the EGR valve 33. More specifically, when the amount of change ΔPm is within an appropriate range which is set beforehand, it is determined that there is no abnormality in the EGR mechanism 31. On the other hand, if the amount of change ΔPm is outside of that appropriate range, it is determined that there is an abnormality in the EGR mechanism 31.

Executing the abnormality determining routine during a fuel cut in this way makes it possible to determine whether there is an abnormality in the EGR mechanism 31 by executing the routine without causing the internal combustion engine to stall or the like.

Also, during the fuel cut, after it is determined whether there is an abnormality in the EGR mechanism 31, the EGR valve 33, which had been opened by the determining opening amount HO from fully closed, is returned to the state before execution of the abnormality determining routine (i.e., to the fully closed state) by being closed by that determining opening amount HO as shown in FIG. 2C. When the EGR valve 33 is returned to the fully closed state in this way, the flowrate of the gas that flows from the EGR passage 32 into the intake passage 4 decreases as shown in FIG. 2D, and as the flowrate decreases, so too does the intake pressure Pm of the engine 1, as shown in FIG. 2E. The abnormality determining routine then ends when the flowrate of the gas that flows from the EGR passage 32 into the intake passage 4 finishes decreasing as a result of the EGR valve 33 closing by the determining opening amount HO (timing T3).

Incidentally, FIG. 2F shows the set state of a flag F for determining whether the abnormality determining routine which is executed during a fuel cut has ended. As is evident from the drawing, the flag F is set to 0 (i.e., not yet ended) at the start of the fuel cut, and set to 1 (i.e., ended) when the flowrate of the gas that flows from the EGR passage 32 into the intake passage 4 has finished decreasing as a result of the EGR valve 33 closing by the determining opening amount HO (i.e., at timing T3).

Figure 4:
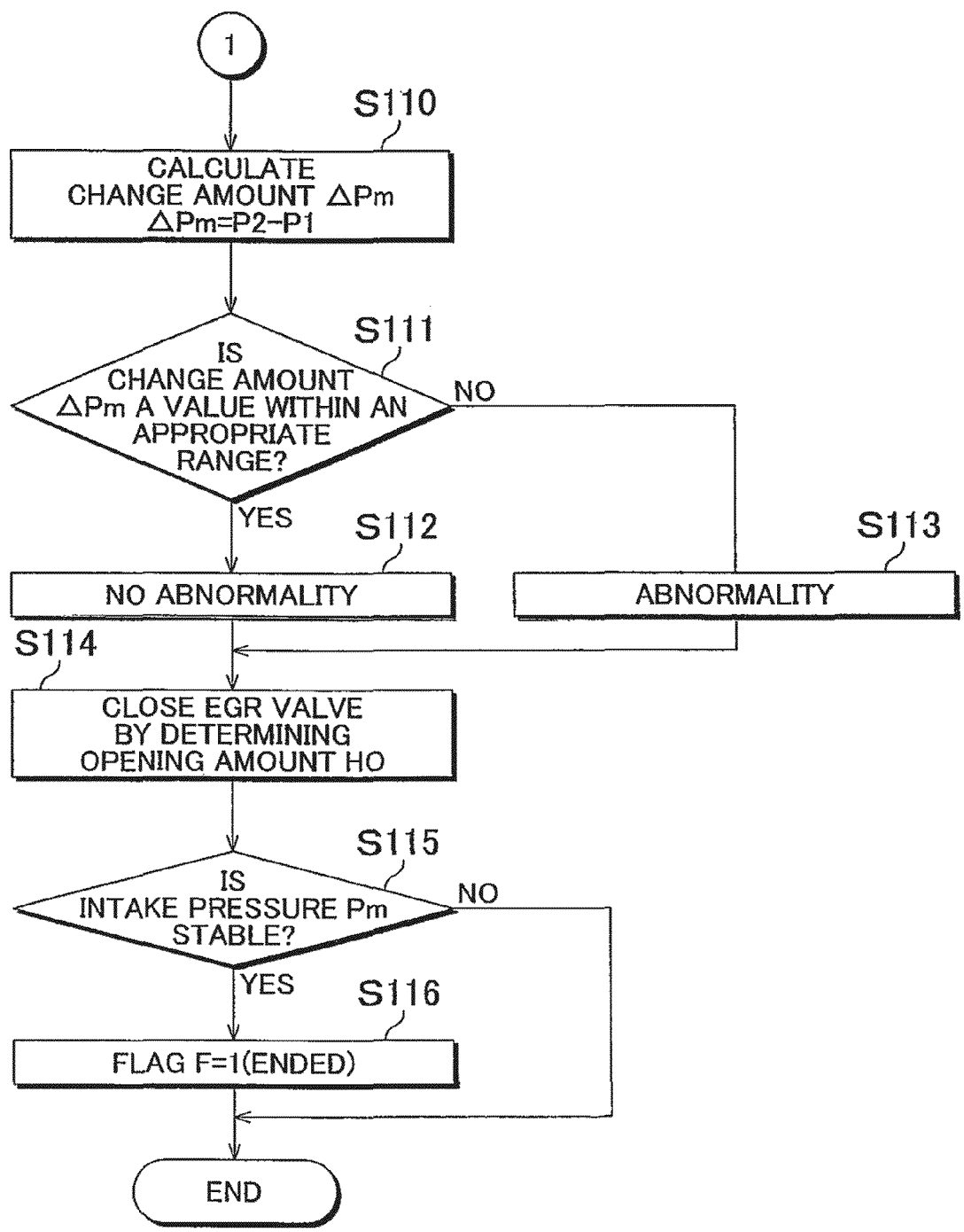
FIG. 4 is a flowchart illustrating the abnormality determining routine according to the first example embodiment of the invention.

Here, the abnormality determining routine will be described in detail with reference to the flowcharts in FIGS. 3 and 4 which illustrate the abnormality determining routine. This abnormality determining routine is executed in cycles at predetermined intervals of time, for example, by the electronic control apparatus 20.

In this routine, first it is determined whether a fuel cut is just starting (i.e., step S101 in FIG. 3). If the determination here is YES, then the flag F for determining whether the abnormality determining routine has ended is set to 0 (i.e., not yet ended) (i.e., step S102). Then if a fuel cut is being performed and the flag F is 0 (i.e., not yet ended) (i.e., YES in both steps S103 and S104), steps (step S105 to 109) in the abnormality determining routine are performed to obtain the intake pressures P1 and P2 before and after the opening amount of the EGR valve 33 is increased by the determining opening amount HO from what it is normally.

More specifically, when the opening amount of the EGR valve 33 is the normal opening amount (i.e., fully closed) during a fuel cut (i.e., YES in step S105), that is, before the opening amount of the EGR valve 33 is increased by the determining opening amount HO from a fully closed state in the abnormality determining routine, the intake pressure Pm at that time is stored as the intake pressure P1 before the opening amount of the EGR valve 33 changes (i.e., step S106). Then the EGR valve 33 is changed by the determining opening amount HO from the fully closed state (i.e., step S107). When the intake pressure Pm stabilizes after the opening amount of the EGR valve starts to change (i.e., YES in step S108), that is, when the flowrate of the gas that flows from the EGR valve 33 into the intake passage 4 finishes changing (i.e., increasing) after the opening amount of the EGR valve 33 is increased by the determining opening amount HO, the intake pressure Pm at that time is stored as the intake pressure P2 after the change in the opening amount of the EGR valve 33 (i.e., step S109).

After the intake pressures P1 and P2 before and after the opening amount of the EGR valve 33 is changed by the determining opening amount HO in the abnormality determining routine are obtained, steps (i.e., steps S110 to 113) are performed to determine whether there is an abnormality in the EGR mechanism 31 using these intake pressures P1 and P2.

More specifically, the amount of change ΔPm, which is a value corresponding to the change in the intake pressure Pm as a result of the opening amount of the EGR valve 33 being increased by the determining opening amount HO from a fully closed state, is obtained as the difference between the intake pressures P1 and P2 according to Expression (1) below (i.e., step S110).

$$\Delta Pm = P2 - P1 \quad (1)$$

Then it is determined whether that amount of change ΔPm is within an appropriate range that is set beforehand (i.e., step S111). If the determination here is YES, then it is determined that there is no abnormality in the EGR mechanism 31 (i.e., step S112). If, on the other hand, the determination is NO, then it is determined that there is an abnormality in the EGR mechanism 31 (i.e., step S113). Incidentally, if it is determined that there is an abnormality in the EGR mechanism 31 in this way, various measures may be taken, such as storing the determination results indicative of that abnormality in nonvolatile RAM of the electronic control apparatus 20 and illuminating a warning lamp provided near the driver's seat in the vehicle.

As described above, after the determination as to whether there is an abnormality in the EGR mechanism 31 is made, a step (i.e., step S114) is performed to return the opening amount of the EGR valve 33 to the state before the abnormality determining routine (i.e., the fully closed state) by decreasing the opening amount of the EGR valve 33 by the determining opening amount HO. Moreover, thereafter when the intake pressure Pm has stabilized (i.e., YES in step S115), i.e., when the flowrate of the gas that flows from the EGR passage 32 into the intake passage 4 finishes decreasing as a result of the EGR valve 33 being closed by the determining opening amount HO, the flag F is set to 1 (ended) (i.e., step S116).

It is also conceivable that before it the determination as to whether there is an abnormality in the EGR mechanism 31 has been made, the fuel cut may be stopped by the vehicle suddenly stopping or accelerating or the like while the EGR valve 33 is open by the determining opening amount HO from the fully closed state from the abnormality determining routine being executed during a fuel cut. More specifically, as shown in FIG. 5, it is conceivable that the fuel cut may be stopped before, e.g., right before, the determination as to whether there is an abnormality in the EGR mechanism 31 is made based on the amount of change ΔPm (i.e., timing T2), as shown in FIG. 5A.

In this case, the abnormality determining routine is cancelled and the EGR valve 33, which had been temporarily opened, is returned to the state prior to the execution of the abnormality determining routine, as shown in FIG. 5C (hereinafter, this will be referred to as "returning the EGR valve 33"). Also, fuel starts to be injected again in the engine 1 when the fuel cut stops, and the fuel injection quantity in the engine 1 is set to a value corresponding to the engine operating state such as the engine speed and engine load at that time, as shown by the two alternate long and two short dashes line in FIG. 5B. The fuel injection quantity (denoted by the alternate long and two short dashes line) at this time is set to a value that enables the air-fuel ratio of the air-fuel mixture in the combustion chamber 3 of the engine 1 to be an appropriate value on the condition that the EGR valve 33 is fully closed and EGR is not being performed.

However, when the EGR valve is temporarily open by the determining opening amount HO from the fully closed state as a result of the abnormality determining routine being executed during a fuel cut (after T1), the following problem inevitably occurs, in connection to the fact that the EGR passage 32 is filled with air, when the abnormality determining routine is cancelled when the fuel cut stops.

That is, when the EGR valve 33, which has been temporarily opened by the determining opening amount HO due to the abnormality determining routine being executed, is returned, air inside the EGR passage 32 (i.e., the EGR mechanism 31) flows into the intake passage 4. As a result, there is too much air, by the amount of air that flows from the EGR passage 32 into the intake passage 4, in the combustion chamber 3 for the fuel injection quantity after fuel injection resumes in the engine 1.

There are two reasons why the air in the EGR passage 32 flows into the intake passage 4 when the abnormality determining routine is cancelled. (1) There is a response delay until the EGR valve 33 closes when it is returned to the state that it was in before being opened by the determining opening amount HO (i.e., the fully closed state), as shown after timing T2 in FIG. 5C. (2) There is also a response delay until the flowrate of the gas (i.e., air) that flows through the EGR passage 32 and into the intake passage 4 decreases following a decrease in the opening amount of the EGR valve 33, as shown after timing T2 in FIG. 5D.

Therefore, the air-fuel ratio of the air-fuel mixture in the combustion chamber 3 inevitably becomes leaner than the appropriate value until the flowrate of the gas that flows from the EGR passage 32 into the intake passage 4 finishes changing after the EGR valve 33 changes back to the state before being opened by the determining opening amount HO (i.e., back to the fully closed state) after timing T2 (i.e., until timing T4 in the drawing). That is, after the abnormality determining routine is cancelled when the fuel cut stops and fuel injection in the engine 1 resumes (i.e., after timing T2) until timing T4, the intake air in the engine 1 becomes excessive, by an amount corresponding to the amount shown by the slanted lines (i.e., the hatching) in FIG. 5D, with respect to the fuel injection quantity (indicated by the two alternate long and two short dashes line in FIG. 5B). When the intake air amount is excessive with respect to the fuel injection quantity, it results in the air-fuel ratio of the air-fuel mixture in the combustion chamber 3 becoming leaner than the appropriate value, which leads to unstable combustion of the air-fuel mixture in the combustion chamber 3, which may cause the speed of the engine 1 to decrease or the engine 1 to stall or the like.

Therefore, in this example embodiment, the fuel injection quantity of the engine 1 is increase corrected as shown by the solid line after timing T2 in FIG. 5B from after timing T2 until timing T4 in FIG. 5.

As a result, even if there is a response delay in the change in (i.e., reduction of) the opening amount when the EGR valve 33 is changed back to the state before being opened by the determining opening amount HO (i.e., to the fully closed state), and there is a response delay in the decrease in flowrate of the gas (i.e., air) that flows from the EGR passage 32 into the intake passage 4 as a result of the change in the opening amount of the EGR valve 33, it is possible to suppress the intake air amount from becoming excessive with respect to the fuel injection quantity from timing T2 to timing T4. Therefore, between timing T2 and timing T4, the air-fuel ratio of the air-fuel mixture in the combustion chamber 3 is inhibited from becoming leaner than the appropriate value, and as a result, combustion of that air-fuel mixture is inhibited from becoming unstable, which in turn inhibits the speed of the engine 1 from decreasing and the engine 1 from stalling or the like.

Figure 6:
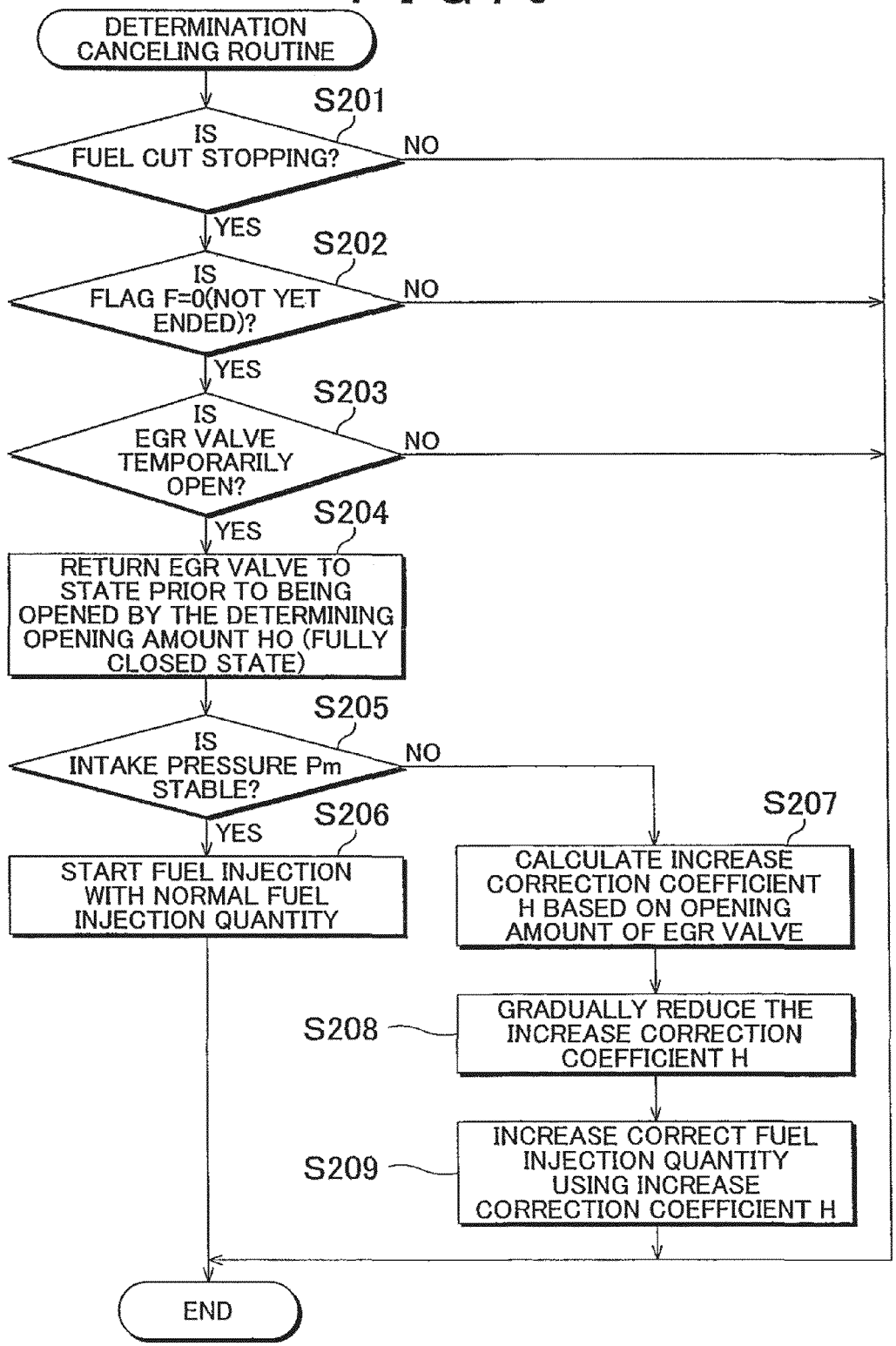
FIG. 6 is a flowchart illustrating a routine that is executed when the abnormality determining routine is cancelled according to the first example embodiment.

Next, a routine that is executed when the abnormality determining routine is cancelled due to a fuel cut being stopped will be described in detail with reference to the flowchart in FIG. 6 which illustrates a determination canceling routine. This determination canceling routine is executed in cycles at predetermined intervals of time, for example, by the electronic control apparatus 20.

In this routine, it is determined whether the fuel cut is at the stopping point (step S201), whether the flag F is at 0 (not yet ended) (step S202), and whether the EGR valve 33 is temporarily open due to the abnormality determining routine being executed (step S203). Incidentally, with regard to the determination in step S202, when the fuel cut is stopped and fuel injection is resumed before it is determined whether there is an abnormality in the EGR mechanism 31 in the abnormality determining routine, as shown in FIG. 5, the flag F is kept at 0 (not yet ended), as shown in FIG. 5F.

If all of these determinations are YES, it is determined that the abnormality determining routine has been cancelled due to the fuel cut being stopped while the EGR valve 33 is still temporarily open from a fully closed state. In this case, the opening amount of the EGR valve 33 is reduced to return the EGR valve 33 to the state prior execution of the abnormality determining routine, that is, to the state before being opened by the determining opening amount HO, i.e., to the fully closed state (step S204). Then the fuel injection quantity after fuel injection is resumed in the engine 1 when the fuel cut stops is controlled through steps S205 to S209.

More specifically, first it is determined whether the intake pressure Pm is stable after the EGR valve 33 has started to be returned in step S204 (step S205). In other words, it is determined whether the flowrate of gas that flows from the EGR passage 32 into the intake passage 4 has finished decreasing.

Figure 7:
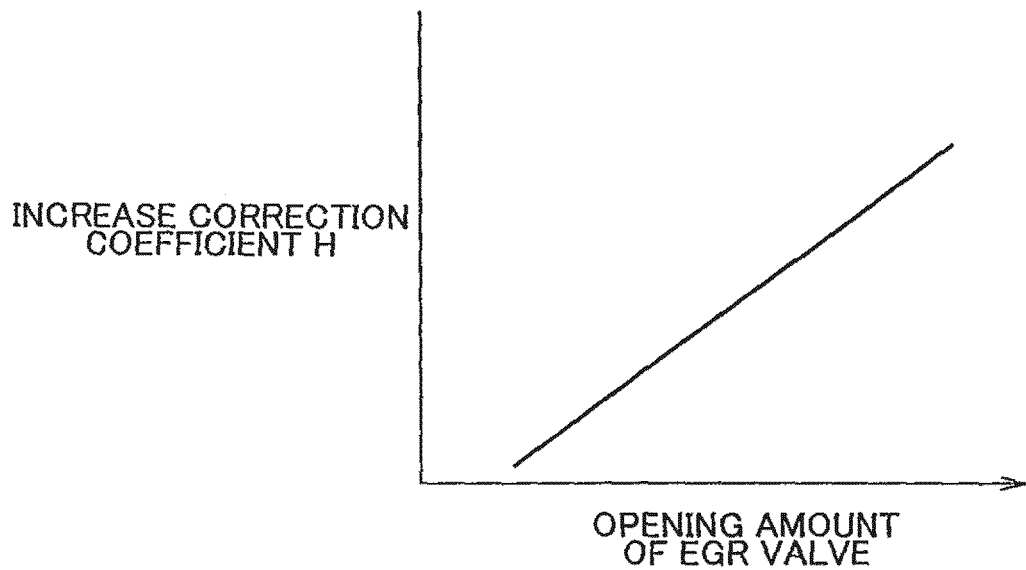
FIG. 7 is a graph showing the shift in an increase correction coefficient following a change in the opening amount of the EGR valve in the first example embodiment of the invention.

If the determination in this step is NO, then an increase correction coefficient H, which is an increase correction value for increase-correcting the fuel injection quantity of the engine 1, is calculated (step S207). This increase correction coefficient H is calculated to be a reduced value that matches the reduction in the opening amount of the EGR valve 33, as shown in FIG. 7, based on the opening amount of the EGR valve 33 as it is returned to the fully closed state. Accordingly, the increase correction coefficient H is a value that is variably set so as to be lower to reduce the increase correction of the fuel injection quantity to match the decrease in the opening amount of the EGR valve 33 shown after timing T2 in FIG. 5C. Incidentally, it is also possible to correct the increase correction coefficient H based on the atmospheric pressure and the intake air temperature so as to make the increase correction coefficient H an accurate value that is unaffected by changes in the oxygen concentration in the air which are caused by changes in the atmospheric pressure and intake air temperature. In this case, the increase correction coefficient H is corrected according to the atmospheric pressure so as to become larger as the atmospheric pressure increases, and corrected according to the intake air temperature so as to become smaller as the intake air temperature increases.

Then, when the increase correction coefficient H is made a reduced value to match the decrease in the opening amount of the EGR valve 33, as described above, it is reduced gradually according to Expression (2) such that its decrease matches the decrease in flowrate of the gas as shown after timing T2 in FIG. 5D (step S208).

Increase correction coefficient $H \leftarrow$ Increase correction coefficient $H_{i-1}$ of last calculation$-(1/n) \times$(Increase correction coefficient $H_{i-1}$ of last calculation$-$Increase correction coefficient $H_i$ of current calculation) (2)

Incidentally, the term "n" in Expression (2) represents an arbitrary natural number greater than 1. Setting this value appropriately results in the increase correction coefficient H that is to be reduced.

Then the increase correction coefficient H that has been gradually reduced is multiplied by the fuel injection quantity of the command value, and the fuel injection quantity is increase corrected using this increase correction coefficient H (step S209). The increase correction of the fuel injection quantity is reduced to match the decrease in the flowrate of the gas because the increase correction coefficient H is gradually reduced to match the reduction in the gas shown after timing T2 in FIG. 5D. As a result, the fuel injection quantity after fuel injection resumes when the fuel cut stops changes as shown by the solid line after timing T2 in FIG. 5B, becoming a value that corresponds to the flowrate of the gas that changes as shown by the solid line after timing T2 in FIG. 5D.

Then, after the EGR valve 33 starts to return as a result of step S204 being executed, the determination in step S205 is YES once the intake pressure Pm stabilizes, i.e., after the flowrate of the gas that flows from the EGR passage 32 into the intake passage 4 finishes changing (timing T4 in FIG. 5). In this case, fuel of the normal fuel injection quantity starts to be injected (step S206) and fuel injection is performed.

The example embodiment described in detail above yields the following effects. Effect (i): When the abnormality determining routine is cancelled as a result of the fuel cut stopping, the EGR valve 33, which is open wider than normal as a result of that routine, is returned and fuel injection in the engine 1 resumes after the fuel cut stops. The fuel injection quantity at this time is made a value that enables the air-fuel ratio of the air-fuel mixture in the combustion chamber 3 of the engine 1 to be an appropriate value on the condition that the EGR valve 33 is in the state before being opened by the determining opening amount HO (i.e., is in the fully closed state).

However, when the abnormality determining routine is being executed and the EGR valve 33 is temporarily open, the EGR passage 32 is full of air. Also, the response delays described in (1) and (2) above occur when the EGR valve 33 returns following cancellation of the abnormality determining routine. Therefore, even if an attempt is made to reduce the opening amount of the EGR valve 33 to the opening amount before the increase by the determining opening amount HO (i.e., even if an attempt is made to fully close the EGR valve 33) following cancellation of the abnormality determining routine, additional air in the EGR passage 32 will flow into the intake passage 4 at that time because of the response delays described above. If this additional air flows into the intake passage 4 from the EGR passage 32 in this way, it will result in too much air for the fuel injection quantity being drawn into the combustion chamber 3. As a result, the air-fuel ratio of the air-fuel mixture in the combustion chamber 3 will become leaner than the appropriate value, causing the combustion of the air-fuel mixture to become unstable, which may result in a loss of engine speed or even engine stall or the like.

However, after the abnormality determining routine is cancelled as a result of the fuel cut stopping and fuel injection in the engine 1 resumes, the fuel injection quantity in the engine 1 is increase corrected until the flowrate of gas that flows from the EGR passage 32 into the intake passage 4 has finished changing following the return of the EGR valve 33. As a result, even if there is a response delay in the return of the EGR valve 33 and the change in the flowrate of the gas (i.e., air) that flows from the EGR passage 32 into the intake passage 4 following that return of the EGR valve 33, the air-fuel ratio of the air-fuel mixture in the combustion chamber 3 is inhibited from becoming leaner than the appropriate value. Further, combustion of the air-fuel mixture is inhibited from becoming unstable as a result of the air-fuel ratio of the air-fuel mixture in the combustion chamber 3 becoming leaner than the appropriate value, such that a loss of engine speed or engine stall or the like is also inhibited.

Effect (ii): When returning the EGR valve 33 following cancellation of the abnormality determining routine, the flowrate of the gas (i.e., air) that flows from the EGR passage 32 into the intake passage 4 gradually decreases as a result while reflecting the response delay. The fuel injection in the engine 1 that resumes after cancelation of the abnormality determining routine is such that the correction coefficient of the fuel injection quantity is reduced to match the decrease in the flowrate of the gas that flows from the EGR passage 32 into the intake passage 4. Therefore, the air-fuel ratio of the air-fuel mixture in the combustion chamber 3 can be inhibited from becoming leaner or richer than the appropriate value while the fuel injection quantity is being increase corrected, thus enabling the air-fuel ratio to be maintained at the appropriate value.

Effect (iii): When the opening amount of the EGR valve 33 is reduced to the opening amount before the increase by the determining opening amount HO (i.e., when fully closing the EGR valve 33) when the abnormality determining routine is cancelled, there is a response delay in that reduction. However, the increase correction coefficient H used to increase-correct the fuel injection quantity can be variably set to a reduced value to match the reduction in the opening amount of the EGR valve 33 at that time. Therefore, that increase correction coefficient H can be made a value that corresponds to the opening amount of the EGR valve 33 that includes the response delay in the reduction of the opening amount, as described above. Also, when reducing the opening amount of the EGR valve 33 to the opening amount before the increase by the determining opening amount HO (i.e., when fully closing the EGR valve 33), there is a response delay in the change in the flowrate of gas (i.e., air) that flows from the EGR passage 32 into the intake passage 4 following the reduction in the opening amount of the EGR valve 33. However, the increase correction coefficient H at that time is reduced gradually to match the change in the flowrate of the gas. As a result, the increase correction coefficient H can be made to accurately correspond to the flowrate of the gas which includes the response delay in the reduction of the flowrate. Thus, by increase-correcting the fuel injection quantity using this increase correction coefficient H, the air-fuel ratio of the air-fuel mixture within the combustion chamber 3 can be kept even more precisely at the appropriate value.

Next, a second example embodiment of the invention will be described with reference to FIG. 8. This second example embodiment is similar to the first example embodiment in that when the EGR valve 33 is returned to the normal state before the opening amount is increased by the determining opening amount HO (i.e., to the fully closed state) (hereinafter, this action by the EGR valve 33 will simply be referred to as "return") by increase-correcting the fuel injection quantity using the increase correction coefficient H, that increase correction is reduced to match the reduction in the flowrate of gas that flows from the EGR passage 32 into the intake passage 4 as the EGR valve 33 returns. However, this second example embodiment differs from the first example embodiment in the way in which the increase correction coefficient H that is used to make the increase correction is calculated.

More specifically, the intake pressure P1 (see FIG. 5E) before the EGR valve 33 is opened by the determining opening amount HO when the abnormality determining routine is executed during a fuel cut is stored as the reference pressure. Also, the increase correction coefficient H decreases as the actual intake pressure Pm of the engine 1 approaches the intake pressure P1 (i.e., the reference pressure) from the time fuel injection in the engine 1 resumes until the flowrate of the gas that flows from the EGR passage 32 into the intake passage 4 finishes changing when the EGR valve 33 is returned (i.e., from T2 to T4 in FIG. 5).

FIG. 8 is a flowchart illustrating a determination canceling routine of this example embodiment. This routine differs from the routine determination canceling routine of the first example embodiment only with respect to steps S307 and S308, which correspond to steps S207 and S208 (FIG. 6) of the routine of the first example embodiment.

In the determination canceling routine of this example embodiment as well, it is first determined whether the abnormality determining routine has been cancelled due to a fuel cut being stopped while the EGR valve 33 is temporarily open from the fully closed state (steps S301 to S303). If the determinations in these steps are all YES (i.e., YES in steps S301 to S303), then the EGR valve 33 is returned (step S304), after which fuel injection quantity control is performed after fuel injection in the engine 1 resumes when the fuel cut stops (steps S305 to S309).

More specifically, the fuel injection quantity is increase corrected using the increase correction coefficient H (steps S307 to S309) after the EGR valve 33 starts to return until the intake pressure Pm stabilizes (i.e., NO in step S305). Also, once the intake pressure stabilizes (i.e., YES in step S305), fuel of the normal fuel injection quantity starts to be injected (step S306) and normal fuel injection is performed.

Here, the process for calculating the increase correction coefficient H (i.e., steps S307 and S308) will be described in detail. In this series of steps, a ratio Pm/P1 of the actual intake pressure Pm to the intake pressure P1 (i.e., the reference pressure) is obtained (step S307) and this ratio Pm/P1 is set as the increase correction coefficient H (step S308). This ratio Pm/P1 decreases to approach 1 as the actual intake pressure Pm decreases and approaches the intake pressure P1 so the increase correction coefficient H is a value that decreases based on the decrease of the ratio Pm/P1 toward 1.

In addition to the effects (i) and (ii) of the first example embodiment, this example embodiment also yields the following effects. Effect (iv): When the EGR valve 33 is returned following cancellation of the abnormality determining routine, there is a response delay in the change (i.e., decrease) of the opening amount of the EGR valve 33 when it returns, as well as in the change (i.e., reduction) of the flowrate of gas (i.e., air) that flows from the EGR passage 32 into the intake passage 4 as the EGR valve 33 returns. Incidentally, the actual intake pressure Pm of the engine 1 when the response delay occurs in the change (i.e., decrease) of the gas flowrate is a value that corresponds to the actual flowrate of the gas with that response delay. Also, the intake pressure P1 (i.e., the reference pressure) is a value that corresponds to the gas flowrate after the opening amount of the EGR valve 33 has been reduced to the opening amount prior to the EGR valve 33 being opened by the determining opening amount HO, when the flowrate of the gas has finished changing (i.e., decreasing) as a result of the opening amount of the EGR valve 33 decreasing. Therefore, when the fuel injection quantity is increase corrected by the increase correction coefficient H, the increase correction coefficient H can be made to precisely correspond to the flowrate of the gas that includes the delay response in the reduction of the flowrate by reducing the increase correction coefficient H as the actual intake pressure Pm of the engine 1 approaches the intake pressure P1 (i.e., the reference pressure. Accordingly, the air-fuel ratio of the air-fuel mixture within the combustion chamber 3 can be more precisely maintained at the appropriate value by increase-correcting the fuel injection quantity using that increase correction coefficient H.

Effect (v): When changing (i.e., reducing) the opening amount of the EGR valve 33 to the opening amount prior to the EGR valve 33 being opened by the determining opening amount HO (i.e., to the fully closed state), there is a response delay in the reduction of the flowrate of the gas that flows from the EGR passage 32 into the intake passage 4. Throughout the entire intake pressure region, i.e., from the low intake pressure region to the high intake pressure region, the ratio Pm/P1 becomes an appropriate value as a value that corresponds to the degree to which the intake air amount is excessive for the fuel injection quantity, which is caused by the response delay in the reduction of the gas flowrate.

If, for example, the difference between the actual intake pressure Pm of the engine 1 and the intake pressure P1 (i.e., the reference pressure) is used as the value that corresponds to the degree to which the intake air amount is excessive for the fuel injection quantity, then that difference must be corrected according to the intake pressure Pm in order to be an appropriate value for the value that corresponds to the degree to which the intake air amount is excessive for the fuel injection quantity. This is because the sensitivity when the change in the degree to which the intake air amount is excessive for the fuel injection quantity is expressed as a change in that difference changes depending on the intake pressure Pm at that time. In contrast, with the ratio Pm/P1, the sensitivity when the change in the degree to which the intake air amount is excessive for the fuel injection quantity is expressed as a change in that difference is constant regardless of the intake pressure Pm so there is no need to make a correction according to the intake pressure Pm as described above. Therefore, the ratio Pm/P1 can be made an appropriate value for the value that corresponds to the degree to which the intake air amount is excessive for the fuel injection quantity.

The increase correction coefficient H is decreased based on the ratio Pm/P1, i.e., as the ratio Pm/P1 approaches 1, and therefore is an appropriate value for the increase correction value used to increase-correct the fuel injection quantity in order to inhibit the intake air amount from becoming excessive for the fuel injection quantity, which would otherwise occur due to the response delay in the change (i.e., reduction) of the gas flowrate. Therefore, the air-fuel ratio of the air-fuel mixture within the combustion chamber 3 can be more precisely maintained at the appropriate value by increase-correcting the fuel injection quantity using that increase correction coefficient H.

Effect (vi): Because the ratio Pm/P1 is used as it is for the increase correction coefficient H, simply multiplying that increase correction coefficient H by the command value of the fuel injection quantity enables the fuel injection quantity to be increase corrected so that the intake air amount can be reliably inhibited from becoming excessive for the fuel injection quantity, which would otherwise occur due to the response delay in the change (i.e., reduction) of the gas flowrate.

Incidentally, the example embodiments described above may also be modified as follows, for example.

In the second example embodiment, the increase correction coefficient H may also be variably set based on a value indicative of the difference (Pm−P1) of the actual intake pressure Pm minus the intake pressure P1 (i.e., the reference pressure), which has been corrected according to the intake pressure Pm. More specifically, the increase correction coefficient H may also be variably set so that it decreases as that value decreases.

In the second example embodiment, instead of using the ratio Pm/P1 as it is for the increase correction coefficient H, an increase correction coefficient H that is different from the ratio Pm/P1 may be prepared, and that increase correction coefficient H may be variably set so that it decreases as the ratio Pm/P1 approaches 1.

The increase correction coefficient H in the first example embodiment does not necessarily have to be corrected based on the atmospheric pressure and the intake air temperature. However, correcting the increase correction coefficient H based on the atmospheric pressure and the intake air temperature as illustrated in the first example embodiment enables the increase correction coefficient H to be an accurate value that is not affected by changes in the oxygen concentration in the air which are caused by changes in the atmospheric pressure and intake air temperature.

In the first and second example embodiments, instead of increase-correcting the fuel injection quantity by multiplying the increase correction coefficient H by the command value of the fuel injection quantity, the fuel injection quantity may also be increase corrected by adding the increase correction amount to the command value. In this case, the increase correction amount becomes the increase correction value for increase-correcting the fuel injection quantity so that increase correction amount is decreased to match the change (i.e., decrease) in the flowrate of the gas that flows from the EGR passage 32 into the intake passage 4 when the EGR valve 33 is returned following cancellation of the abnormality determining routine.

In the first and second example embodiments, the increase correction of the fuel injection quantity after the abnormality determining routine has been cancelled does not necessarily have to be decreased to match the change (i.e., decrease) in the flowrate of the gas (i.e., air) that flows from the EGR passage 32 into the intake passage 4. For example, the air-fuel ratio of the air-fuel mixture in the combustion chamber may also be inhibited from becoming lean after fuel injection is resumed by making that increase correction constant. In this case, the fuel injection value for making the increase correction is made constant.

In the first and second example embodiments, the invention may also be applied to an engine in which the opening amount (i.e., the normal opening amount) of the EGR valve 33 during a fuel cut when the abnormality determining routine is not being performed is greater than fully closed.

While the invention has been described with reference to example embodiments thereof, it is to be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

The invention claimed is:

1. A control apparatus for an internal combustion engine provided with an EGR mechanism that can change an EGR amount by driving an EGR valve open and closed, comprising:

an abnormality determining portion that performs an abnormality determining process which increases an opening amount of the EGR valve during a fuel cut in the internal combustion engine wider than normal by a determining opening amount which is the opening amount of the EGR valve that is required to perform the abnormality determining process, and determines whether there is an abnormality in the EGR mechanism based on a change in intake pressure in the internal combustion engine following the increase in the opening amount of the EGR valve;

a control portion which changes the opening amount of the EGR valve to the normal opening amount by reducing the opening amount of the EGR valve by the determining opening amount after the abnormality determining portion determines whether there is an abnormality;

an opening amount returning portion which returns the opening amount of the EGR valve to the normal opening amount, which is the opening amount before the opening amount is increased by the determining opening amount, when the fuel cut is stopped and the abnormality determining process is cancelled while the opening amount of the EGR valve is wider than normal as a result of the abnormality determining process; and an increase correcting portion which increase-corrects a fuel injection quantity of the internal combustion engine from after fuel injection in the internal combustion engine resumes when the fuel cut stops until a flowrate of gas that flows from the EGR mechanism into an intake passage finishes decreasing following the decrease in the opening amount of the EGR valve by the opening amount returning portion.

2. The control apparatus according to claim 1, wherein the increase correcting portion reduces the increase correction of the fuel injection quantity to match the decrease in the flowrate of the gas.

3. The control apparatus according to claim 2, wherein the increase correcting portion increase-corrects the fuel injection quantity using an increase correction value, and the increase correcting portion variably sets the increase correction value to be a reduced value to match the decrease in the opening amount of the EGR valve by the opening amount returning portion, and gradually reduces that increase correction value to match the decrease in the flowrate of the gas.

4. The control apparatus according to claim 2, wherein the increase correcting portion i) increase-corrects the fuel injection quantity of the internal combustion engine using an increase correction value, ii) stores the intake pressure of the internal combustion engine before the opening amount of the EGR valve is increased wider than normal by the determining opening amount during the fuel cut as a reference pressure, and iii) reduces the increase correction value as the actual intake pressure of the internal combustion engine approaches the reference pressure from after fuel injection in the internal combustion engine resumes when the fuel cut stops until the flowrate of the gas finishes decreasing.

5. The control apparatus according to claim 4, wherein the increase correcting portion reduces the increase correction value as a ratio of the actual intake pressure of the internal combustion engine to the reference pressure approaches 1 from after fuel injection in the internal combustion engine resumes when the fuel cut stops until the flowrate of the gas finishes decreasing.

6. The control apparatus according to claim 1, wherein the increase correcting portion makes the increase correction of the fuel injection quantity constant.

7. The control apparatus according to claim 1, wherein the increase correcting portion increases the increase correction more as atmospheric pressure increases.

8. The control apparatus according to claim 1, wherein the increase correcting portion reduces the increase correction more as intake air temperature increases.

9. The control apparatus according to claim 1, wherein the normal opening amount of the EGR valve is the opening amount when the EGR valve is fully closed.

10. The control apparatus according to claim 1, wherein the flowrate of gas that flows from the EGR mechanism into the intake passage is regarded to have finished decreasing, following a decrease in the opening amount of the EGR valve by the opening amount returning portion, when the intake pressure in the intake passage has stabilized.

11. An internal combustion engine control method for performing an abnormality determining process of i) increasing an opening amount of an EGR valve during a fuel cut in the internal combustion engine, which is provided with an EGR mechanism that can change an EGR amount by driving then EGR valve open and closed, wider than normal by a determining opening amount, ii) determining whether there is an abnormality in the EGR mechanism based on a change in intake pressure in the internal combustion engine following the increase in the opening amount of the EGR valve, and iii) changing the opening amount of the EGR valve to the normal opening amount by reducing the opening amount of the EGR valve by the determining opening amount after the abnormality determination has been made, the control method comprising:

returning the opening amount of the EGR valve to the normal opening amount, which is the opening amount before the opening amount is increased by the determining opening amount, when the fuel cut is stopped and the abnormality determining process is cancelled while the opening amount of the EGR valve is wider than normal; and increase-correcting a fuel injection quantity of the internal combustion engine from after fuel injection in the internal combustion engine resumes when the fuel cut stops until a flowrate of gas that flows from the EGR mechanism into an intake passage finishes decreasing following the decrease in the opening amount of the EGR valve.

12. The control method according to claim 11, wherein the increase correction of the fuel injection quantity is reduced to match the decrease in the flowrate of the gas.

13. The control method according to claim 12, wherein the increase correction i) increase-corrects the fuel injection quantity using an increase correction value, ii) variably sets the increase correction value to be a reduced value to match the decrease in the opening amount of the EGR valve, and iii) gradually reduces the increase correction value to match the decrease in the flowrate of the gas.

14. The control method according to claim 12, wherein the increase correction i) increase-corrects the fuel injection quantity of the internal combustion engine using an increase correction value, ii) stores the intake pressure of the internal combustion engine before the opening amount of the EGR valve is increased wider than normal by the determining opening amount during the fuel cut as a reference pressure, and iii) reduces the increase correction value as the actual intake pressure of the internal combustion engine approaches the reference pressure from after fuel injection in the internal combustion engine resumes when the fuel cut stops until the flowrate of the gas finishes decreasing.

15. The control method according to claim 14, wherein the increase correction value is reduced as a ratio of the actual intake pressure of the internal combustion engine to the reference pressure approaches 1 from after fuel injection in the internal combustion engine resumes when the fuel cut stops until the flowrate of the gas finishes decreasing.

16. The control method according to claim 11, wherein the increase correction is made using an increase correction coefficient (H), increase correction coefficient H←increase correction coefficient $H_{i-1}$ of last calculation−(1/n)×(increase correction coefficient $H_{i-1}$ of last calculation−increase correction coefficient $H_i$ of current calculation), where n is an arbitrary natural number greater than 1.

* * * * *